United States Patent
Ida et al.

(10) Patent No.: US 8,378,163 B2
(45) Date of Patent: Feb. 19, 2013

(54) CATALYSTS HAVING CATALYTIC MATERIAL APPLIED DIRECTLY TO THERMALLY-GROWN ALUMINA AND CATALYTIC METHODS USING SAME, IMPROVED METHODS OF OXIDATIVE DEHYDROGENATION

(75) Inventors: Junko Ida, Columbus, OH (US); Francis P. Daly, Delaware, OH (US); Terry Mazanec, Solon, OH (US); Barry L. Yang, Dublin, OH (US); Richard Long, New Albany, OH (US)

(73) Assignee: Velocys Corp., Plain City, OH (US)

( * ) Notice: Subject to any disclaimer, the term of this patent is extended or adjusted under 35 U.S.C. 154(b) by 1918 days.

(21) Appl. No.: 11/088,692

(22) Filed: Mar. 23, 2005

(65) Prior Publication Data

US 2005/0272965 A1    Dec. 8, 2005

Related U.S. Application Data

(63) Continuation-in-part of application No. 10/966,162, filed on Oct. 15, 2004.

(60) Provisional application No. 60/556,014, filed on Mar. 23, 2004.

(51) Int. Cl.
*C07C 5/48* (2006.01)

(52) U.S. Cl. ........ 585/658; 585/634; 585/636; 585/654; 585/656; 585/920; 585/925

(58) Field of Classification Search .................. 585/654, 585/660, 658, 659, 656, 634, 636, 920, 925
See application file for complete search history.

(56) References Cited

U.S. PATENT DOCUMENTS

| | | | |
|---|---|---|---|
| 3,907,708 A * | 9/1975 | Lacroix | 502/221 |
| 3,944,505 A * | 3/1976 | LaCroix | 502/327 |
| 4,524,236 A | 6/1985 | McCain | |
| 4,739,124 A | 4/1988 | Ward | |
| 4,760,210 A | 7/1988 | Sweeney | |
| 4,940,826 A | 7/1990 | Font Freide et al. | |
| 5,254,788 A | 10/1993 | Gartside et al. | |
| 5,593,935 A | 1/1997 | Golunski et al. | |
| 5,811,062 A | 9/1998 | Wegeng et al. | |
| 5,935,489 A | 8/1999 | Hershkowitz et al. | |
| 5,997,826 A | 12/1999 | Lodeng et al. | |
| 6,117,578 A | 9/2000 | Lesieur | |

(Continued)

FOREIGN PATENT DOCUMENTS

| | | |
|---|---|---|
| WO | WO 01/12312 | 2/2001 |
| WO | WO 0154807 A1 * | 8/2001 |
| WO | WO 0204388 A1 * | 1/2002 |

OTHER PUBLICATIONS

Vazquez-Zavala, et al., "Characterization of Structure and Catalytic Activity of Pt-Sn Catalysts Supported in Al2O3, SiO2, and TiO2," Applied Surface Science, 136 (1998), 62-72.*

(Continued)

*Primary Examiner* — In Suk Bullock
*Assistant Examiner* — Bradley Etherton
(74) *Attorney, Agent, or Firm* — Frank Rosenberg

(57) ABSTRACT

The invention describes catalysts, methods of making catalysts, methods of making a microchannel reactor, and methods of conducting chemical reactions. It has been discovered that superior performance can be obtained from a catalyst formed by directly depositing a catalytic material onto a (low surface area) thermally-grown alumina layer. Improved methods of conducting oxidative dehydrogenations are also described.

29 Claims, 7 Drawing Sheets

U.S. PATENT DOCUMENTS

| | | | |
|---|---|---|---|
| 6,166,283 | A | 12/2000 | Bharadwaj et al. |
| 6,190,624 | B1 | 2/2001 | Romatier |
| 6,274,113 | B1 | 8/2001 | Heyse et al. |
| 6,315,977 | B1 | 11/2001 | Cantacuzene |
| 6,365,543 | B1 | 4/2002 | Schmidt et al. |
| 6,488,838 | B1 | 12/2002 | Tonkovich et al. |
| 6,515,146 | B1 | 2/2003 | Perregaard et al. |
| 6,566,573 | B1 * | 5/2003 | Bharadwaj et al. ............ 585/658 |
| 6,709,640 | B1 | 3/2004 | Romatier et al. |
| 6,756,340 | B2 | 6/2004 | Voskoboynikov et al. |
| 6,756,515 | B2 | 6/2004 | Rende et al. |
| 7,402,719 | B2 | 7/2008 | Brophy et al. |
| 2003/0007904 | A1 | 1/2003 | Tonkovich et al. |
| 2003/0094381 | A1 | 5/2003 | Bors et al. |
| 2003/0116503 | A1 | 6/2003 | Wang et al. |
| 2004/0034266 | A1 * | 2/2004 | Brophy et al. ................ 585/658 |
| 2004/0220434 | A1 | 11/2004 | Brophy et al. |
| 2008/0031788 | A1 | 2/2008 | Brophy et al. |
| 2009/0004076 | A1 | 1/2009 | Brophy et al. |
| 2009/0012341 | A1 | 1/2009 | Brophy et al. |

OTHER PUBLICATIONS

Bodke, et al., "Oxidative Dehydrogenation of Ethane at Millisecond Contact Times: Effect of H2 Addition" in J. Catalysis, 191, 62-74, (2000)—2000, month unknown.*

PCT Written Opinion in PCT/US2005/009814, mailed Oct. 5, 2006.

Nickel & It's Uses, summarizing an article appearing in Nickel Magazine. Copyright 2006 Nickel Institute.

Official Communication in EP 05 813 296.0-2104, mailed Feb. 25, 2008.

Kestenbaum et al., "Synthesis of ethylene oxide in a microreaction system," in IMRET 3 Proceedings of the Third international Conf. on Microreaction Technology 207-212 (1999).

Beretta et al., "Production of olefins via oxidative dehydrogenation of light paraffins at short contact times," Catalysis Today, 64, pp. 103-111 (2001).

Steinfeldt et al., "Comparative studies of the oxidative dehydrogenation of propane in micro-channels reactor module and fixed-bed reactor," Studies in Surface Science and Catalysis, pp. 185-190 (2001).

Claus et al., "Miniaturization of screening devices for the combinatorial development of heterogensous catalysts," Catalysis Today, 67, pp. 319-339 (2001).

Official Communication in EP 05 813 296.0-2104, mailed Oct. 30, 2008.

Official Communication in CN 200580016489.0, mailed Jun. 5, 2009. English Translation.

* cited by examiner

CATALYSTS HAVING CATALYTIC MATERIAL APPLIED DIRECTLY TO THERMALLY-GROWN ALUMINA AND CATALYTIC METHODS USING SAME, IMPROVED METHODS OF OXIDATIVE DEHYDROGENATION

RELATED APPLICATIONS

In accordance with 35 U.S.C. sect. 119(e), this application claims priority to U.S. Provisional Application No. 60/556,014, filed Mar. 23, 2004. Also, this application is a continuation-in-part of U.S. patent application Ser. No. 10/966,162, filed Oct. 15, 2004.

GOVERNMENT RIGHTS CLAUSE

This invention was made with Government support under contract # DE-FC36-04G014154 awarded by DOE. The Government has certain rights in this invention.

FIELD OF THE INVENTION

This invention relates to microchannel apparatus, catalysts and methods of making same. The invention also relates to chemical reactions and microchannel chemical reactors.

INTRODUCTION

In recent years there has been tremendous academic and commercial interest in microchannel devices. This interest has arisen due to the advantages from microtechnology including reduced size, increased productivity, the ability to size systems of any desired capacity (i.e., "number-up"), increased heat transfer, and increased mass transfer. A review of some of the work involving microreactors (a subset of microchannel apparatus) has been provided by Gavrilidis et al., "Technology And Applications Of Microengineered Reactors," Trans. IChemE, Vol. 80, Part A, pp. 3-30 (January 2002).

Microchannel apparatus can be made of a variety of materials including ceramics, plastics, and metals. In many applications, process channels in microchannel apparatus require a coating or coatings over the structural material. The coatings can serve purposes such as absorption, adsorption, and catalysis. In some cases, microchannels are slurry coated or sol coated; for example, an oxide coat applied to a ceramic honeycomb. In some cases, sheets of a material are coated and then assembled and bonded to form a multilayer microchannel device.

Since one focus of the present invention includes aluminide coatings, reference can be made to early work described by LaCroix in U.S. Pat. No. 3,944,505. This patent describes a catalytic device made of a stack of expanded metal sheets (such as Inconel). The metal sheets carry a layer of a nickel or cobalt aluminide and a layer of alpha alumina on the aluminide, and a catalytic surface on the aluminide. LaCroix did not describe how the aluminide layer was formed on the sheets, nor did LaCroix provide any data describing the aluminide layer, nor the alumina layer, nor the catalytic surface.

Methods of forming aluminide coatings are well known and have been utilized commercially for coating certain jet engine parts. Methods of making aluminide coatings from aluminum halides are described in, for example, U.S. Pats. Nos. 3,486,927 and 6,332,926.

There have been attempts to apply aluminide coatings on interior channels of gas turbine airfoils. Rigney et al. in U.S. Pat. No. 6,283,714 reported coating internal cooling passages of turbine blades with an aluminum coating using a slurry/pack process. Rigney et al. also stated that an aluminum halide gas could be passed through the cooling passages at high temperature so that an aluminum coating about 0.002 inch (50 µm) thick may be deposited in about 4 to 8 hours. Pfaendter et al. in U.S. Pat. No. 6,332,926 also suggests flowing an aluminum-coating precursor to deposit aluminum onto an internal airfoil surface.

Howard et al. in U.S. Pat. No. 5,928,725 entitled "Method and Apparatus for Gas Phase Coating Complex Internal Surfaces of Hollow Articles," reviewed prior art methods of gas phase coating methods for coating internal surfaces but remarked that the prior art methods were ineffective for coating multiple gas passages of modern airfoils and result in non-uniform internal coatings. In the process described in this patent, the coating gas flow rate is controlled to a different rate into at least two channels. Howard et al. state that a coating mixture including aluminum powder, aluminum oxide and aluminum flouride could be heated to deliver a coating gas. This improved method was reported to result in an aluminide coating thickness of 1.5 mils±1.0 mil.

The present invention relates to catalytic processes, especially oxidative dehydrogenation to produce olefins.

Olefins find widespread utility in industrial organic chemistry. Ethylene is needed for the preparation of important polymers, such as polyethylene, vinyl plastics, and ethylene-propylene rubbers, and important basic chemicals, such as ethylene oxide, styrene, acetaldehyde, ethyl acetate, and dichloro-ethane. Propylene is needed for the preparation of polypropylene plastics, ethylene-propylene rubbers, and important basic chemicals, such as propylene oxide, cumene, and acrolein. Isobutylene is needed for the preparation of methyl tertiary butyl ether. Long chain mono-olefins find utility in the manufacture of linear alkylated benzene sulfonates, which are used in the detergent industry.

Low molecular weight olefins, such as ethylene, propylene, and butylene, are produced almost exclusively by thermal cracking (pyrolysis/steam cracking) of alkanes at elevated temperatures. An ethylene plant, for example, typically achieves an ethylene selectivity up to 85 percent calculated on a carbon atom basis at an ethane conversion of about 60 mole percent. Undesired coproducts are recycled to the shell side of the cracking furnace to be burned, so as to produce the heat necessary for the process. Disadvantageously, thermal cracking processes for olefin production are highly endothermic. Accordingly, these processes require the construction and maintenance of large, capital intensive, and complex cracking furnaces. The heat required to operate these furnaces at a temperature of about 900. degree. C. is frequently obtained from the combustion of natural gas which disadvantageously produces undesirable quantities of carbon dioxide. As a further disadvantage, the crackers must be shut down periodically to remove coke deposits on the inside of the cracking coils.

Catalytic processes are known wherein paraffinic hydrocarbons are oxidatively dehydrogenated to form mono-olefins. In these processes, a paraffinic hydrocarbon is contacted with oxygen in the presence of a catalyst consisting of a platinum group metal or mixture thereof deposited on a ceramic monolith support, typically in the form of a honeycomb or foam. Optionally, hydrogen may be a component of the feed. The catalyst, prepared using conventional techniques, is uniformly loaded throughout the support. The process can be conducted under autothermal reaction conditions wherein the feed is partially combusted, and the heat produced during combustion drives the endothermic cracking processes. Consequently, under autothermal process conditions there is no external heat source required; however, the catalyst is required to support combustion above the normal fuel-rich limit of flammability. Representative references disclosing this type of process include the following U.S. Pat. Nos. 4,940,826; 5,105,052; 5,382,741; and 5,625,111. Disadvantageously, substantial amounts of deep oxidation products, such as carbon monoxide and carbon dioxide, are produced, and the selectivity to olefins remains too low when compared with thermal cracking. Long term stability of the catalyst and heat management of the system are not addressed.

M. Huff and L. D. Schmidt disclose in the Journal of Physical Chemistry, 97, 1993, 11,815, the production of ethylene from ethane in the presence of air or oxygen under autothermal conditions over alumina foam monoliths coated with platinum, rhodium, or palladium. A similar article by M. Huff and L. D. Schmidt in the Journal of Catalysis, 149, 1994, 127-141, discloses the autothermal production of olefins from propane and butane by oxidative dehydrogenation and cracking in air or oxygen over platinum and rhodium coated alumina foam monoliths. Again, the olefin selectivity achieved in these processes is not significantly better than thermal cracking, and heat management of the system is not addressed so that catalyst temperatures can greatly exceed gas temperatures.

U.S. Pat. No. 5,639,929 teaches an autothermal process for the oxidative dehydrogenation of C2C6 alkanes with an oxygen-containing gas in a fluidized catalyst bed of platinum, rhodium, nickel, or platinum-gold supported on alpha alumina or zirconia. Ethane produces ethylene, while higher olefins produce ethylene, propylene, and isobutylene. Again, the olefin selectivity could be improved. Temperature excursions of the catalyst are not controllable on a local level, and the catalyst temperature can be much higher than the gas temperature.

C. Yokoyama, S. S. Bharadwaj and L. D. Schmidt disclose in Catalysis Letters, 38, 1996, 181-188, the oxidative dehydrogenation of ethane to ethylene under autothermal reaction conditions in the presence of a bimetallic catalyst comprising platinum and a second metal selected from tin, copper, silver, magnesium, cerium, lanthanum, nickel, cobalt, and gold supported on a ceramic foam monolith. The use of a catalyst comprising platinum with tin and/or copper results in an improved olefin selectivity; however, over time at high operating temperatures the second metal vaporizes off the catalyst and catalytic activity decreases. When this occurs the reactor must be shut down to replace or regenerate the catalyst. Again, the temperature of the catalyst can be very much higher than the temperature of the reacting gas leading to poor catalyst life and poor selectivity to olefins.

L. D. Schmidt, J. Siddall and M. Bearden in AIChE Journal 46 (2000) 1492-1495 report the results of experiments on Pt containing catalysts supported on foam monoliths. While the conversions and yields of ethylene were better than some steam cracking results, "the axial and radial gradients in temperature and concnetration are extremely large" suggesting that the catalyst life will be very limited and that process optimization will not be simple.

L. Late, J.-I. Rundereim, and E. A. Blekkan describe experiments on conventional Pt, Pt—Sn and Sn supported on silica catalysts for the selective oxidation of hydrogen in the presence of propane in Applied CatalysisA: General 262 (2004) 53-61. Their experiments are limited to modest temperatures below 600 C and conversions of alkane are very low.

U.S. Pat. No. 6,566,573 teaches the autocatalytic oxidative conversion of paraffins to olefins using fixed bed, fluid bed, or monolithic catalysts. Best conversion and olefin selectivity values of 72 and 82% are described. No attempt to control the catalyst temperature is described and the process is operated adiabatically or nearly so, resulting in olefin yields and selectivities in need of further improvement.

In view of the above, it would be desirable to discover an autothermal catalytic process of oxidizing a paraffinic hydrocarbon to an olefin wherein the selectivity to ethylene is high. Such a process would provide the benefits of a catalytic autothermal process, such as low levels of reactor coking and simplified engineering. It would be even more desirable if a catalytic oxidation process was to achieve a paraffinic hydrocarbon conversion and an olefin selectivity comparable to or exceeding those achieved by commercial thermal cracking processes.

As described below, the present invention provides novel microchannel apparatus having improved coatings. Microchannel devices provide the opportunity to control the peak temperature of the catalyst, leading to better themal integratioin, lower tendency for the catalyst to deactivate, and better product selectivity. The invention also includes methods of conducting reactions through microchannel devices with coated microchannels.

SUMMARY OF THE INVENTION

In a first aspect, the invention provides a method of conducting a chemical reaction, comprising: passing a reactant into a microchannel reactor and converting the reactant to at least one product.

The microchannel reactor of the first aspect, comprises: a reaction microchannel comprising a metal substrate; a dense and substantially defect-free alumina layer disposed on the metal substrate; and catalyst metal particles directly disposed on the alumina layer. The catalyst on the reactor may have the catalyst characteristics described herein. For example, in some embodiments at least 30% of the mass of the catalyst metal is in the form of particles having a size of 3 μm or more. Preferably, the metal substrate comprises a microchannel wall. Although this reactor is described in connection with a method, the invention also includes the reactor itself.

In another aspect, the invention provides a process for converting ethane to ethylene, comprising: contacting ethane and oxygen in a reaction microchannel; wherein (a) at least 50% of the ethane entering the reaction microchannel is converted to products and the selectivity to ethene is at least 85%; or (b) at least 70% of the ethane entering the reaction microchannel is converted to products and the selectivity to ethene is at least 80%; and wherein the levels of selectivity and conversion are based on a single pass through the reaction microchannel. The reaction microchannel comprises a catalyst coated on a substrate. In a preferred embodiment, the substrate is a wall of the reaction microchannel. Preferably, this reaction is conducted with relatively little diluent. Preferably, in this process, heat is removed from the reaction microchannel into an adjacent heat exchanger, preferably a microchannel heat exchanger.

In a further aspect, the invention provides a process for oxidative dehydrogenation, comprising: passing an alkane over a fixed catalyst comprising Pt and Sn in a Pt/Sn atomic ratio in the range of 1 to 4 directly disposed on a dense and substantially defect-free oxide layer.

In another aspect, the invention provides a process of making a catalyst in a microchannel reactor, comprising: forming an aluminide layer in an interior microchannel; thermally growing an alumina layer from the aluminide layer; and depositing a catalyst material directly onto the thermally-grown alumina.

In a further aspect, the invention provides a catalyst comprising: an aluminide-containing substrate; a thermally-grown alumina layer disposed on the aluminum containing substrate; and a catalyst material directly disposed on the thermally-grown alumina layer.

The invention includes methods for catalytic chemical conversion, such method comprising flowing a reactant fluid composition into a microchannel, wherein a catalyst composition is present in the microchannel (on a microchannel wall or elsewhere within the microchannel), and reacting the reactant fluid composition to form a desired product (or products) in the microchannel. The invention further includes methods for catalytic chemical conversion comprising contacting at least one reactant with an inventive catalyst.

Some aspects of the present invention include passage of gaseous aluminum compounds over metal surfaces (especially a metal wall of a microchannel) and simultaneously or subsequently reacting with a metal in the substrate to form a surface layer of metal aluminide—this process is termed aluminization, perhaps more accurately, aluminidization. Conditions for aluminidization are conventionally known for jet engine parts, and the conventional steps are not described here. Certain steps such as excluding oxygen, controlling flow, and passage through manifolds are discussed in greater detail below.

Conventional wisdom is to form catalysts by depositing catalyst materials on high surface area supports. In contrast, the present invention provides catalysts in which a catalytic material is deposited directly on a dense or thermally-grown alumina layer. The thermally-grown alumina layer has excellent adhesion and the resulting catalyst (including alumina layer and deposited catalytic material) has excellent activity in a microchannel reactor, especially for high temperature reactions at high flow rates (low contact times).

Glossary of Terms Used

"Metal aluminide" refers to a metallic material containing 10% or more Metal and 5%, more preferably 10%, or greater Aluminum (Al) with the sum of Metal and Al being 50% or more. These percentages refer to mass percents. Preferably, a metal aluminide contains 50% or more Metal and 10% or greater Al with the sum of Ni and Al being 80% or more. In embodiments in which Metal and Al have undergone significant thermal diffusion, it is expected that the the composition of a Metal-Al layer will vary gradually as a function of thickness so that there may not be a distinct line separating the Metal-Al layer from an underlying Metal-containing alloy substrate. The term "aluminide" is used synonamously with metal aluminide.

A preferred metal aluminide is nickel aluminide (NiAl). "Nickel aluminide" refers to a material containing 10% or more Ni and 10% or greater Al with the sum of Ni and Al being 50% or more. These percentages refer to mass percents. Preferably, a nickel aluminide contains 20% or more Ni and 10% or greater Al with the sum of Ni and Al being 80% or more. In embodiments in which Ni and Al have undergone significant thermal diffusion, it is expected that the the composition of a Ni—Al layer will vary gradually as a function of thickness so that there may not be a distinct line separating the Ni—Al layer from an underlying Ni-based alloy substrate.

A "catalyst material" is a material that catalyzes a desired reaction. It is not alumina. A catalyst material "disposed over" a layer can be a physically separate layer (such as a sol-deposited layer) or a catalyst material disposed within a porous, catalyst support layer. "Disposed onto" or "disposed over" mean directly on or indirectly on with intervening layers. In some preferred embodiments, the catalyst material is directly on a thermally-grown alumina layer.

A "catalyst metal" is the preferred form of catalyst material and is a material in metallic form that catalyzes a desired reaction. Particularly preferred catalyst metals are Pd, Rh and Pt.

As is conventional patent terminology, "comprising" means including and when this term is used the invention can, in some narrower preferred embodiments, be described as "consisting essentially of" or in the narrowest embodiments as "consisting of." Aspects of the invention described as "comprising a" are not intended to be limited to a single component, but may contain additional components. Compositions "consisting essentially of" a set of components allow other components that so not substantially affect the character of the invention, and, similarly, compositions that are "essentially" without a specified element do not contain amounts of the element as would substantially affect the desired properties.

Unless stated otherwise, "conversion percent" refers to absolute conversion percent throughout these descriptions. "Contact time" is defined as the total catalyst chamber volume (including the catalyst substrate volume) divided by the total volumetric inlet flowrate of reactants at standard temperature and pressure (STP: 273 K and 1.013 bar absolute). Catalyst chamber volume includes any volume between a catalyst coating (or other flow-by catalyst arrangement) and the opposite wall of a reaction channel.

A "complex microchannel" is in apparatus that includes one or more of the following characteristics: at least one contiguous microchannel has a turn of at least 45°, in some embodiments at least 90°, in some embodiments a u-bend; a length of 50 cm or more, or a length of 20 cm or more along with a dimension of 2 mm or less, and in some embodiments a length of 50-500 cm; at least 2 adjacent channels, having an adjacent length of at least one cm that are connected by plural orifices along a common microchannel wall where the area of orifices amounts to 20% or less of the area of the microchannel wall in which the orifices are located and where each orifice is 0.6 mm$^2$ or smaller, in some embodiments 0.1 mm$^2$ or smaller—this is a particularly challenging configuration because a coating should be applied without clogging the holes; or at least two, in some embodiments at least 5, parallel microchannels having a length of at least 1 cm, have openings to an integral manifold, where the manifold includes at least one dimension that is no more than three times the minimum dimension of the parallel microchannels (for example, if one of the parallel microchannels had a height of 1 mm (as the smallest dimension in the set of parallel microchannels), then the manifold would possess a height of no more than 3 mm). An integral manifold is part of the assembled device and is not a connecting tube. A complex microchannel is one type of interior microchannel.

A "contiguous microchannel" is a microchannel enclosed by a microchannel wall or walls without substantial breaks or openings—meaning that openings (if present) amount to no more than 20% (in some embodiments no more than 5%, and in some embodiments without any openings) of the area of the microchannel wall or walls on which the opening(s) are present.

A "dense and substantially defect-free alumina layer" is illustrated in FIG. 1. To the scientist or engineer skilled in analyzing catalysts, a microscopic examination of a surface will show whether a given alumina surface, or a the surface of a catalyst with an alumina support layer, is or is not "dense and substantially defect-free alumina layer." A preferred type of "dense and substantially defect-free alumina layer" is an alumina layer that is thermally grown from an aluminide at a temperature of 1000 to 1100 ° C.

"Directly disposed" means that the catalytic material is directly applied to the thermally-grown aluminum oxide layer. The catalytic material can be deposited from solution, electroless plating, or less preferably, CVD. There is not an intervening washcoating, nor is the catalytic material codeposited with a washcoated catalyst support. "Directly deposited" has the same meaning.

An "interior microchannel" is a microchannel within a device that is surrounded on all sides by a microchannel wall or walls except for inlets and outlets, and, optionally, connecting holes along the length of a microchannel such as a porous partition or orifices such as connecting orifices between a fuel channel and an oxidant channel. Since it is surrounded by walls, it is not accessible by conventional lithography, conventional physical vapor deposition, or other surface techniques.

An "insert" is a component that can be inserted into a channel.

A "manifold" is a header or footer that connects plural microchannels and is integral with the apparatus.

"Ni-based" alloys are those alloys comprising at least 30%, preferably at least 45% Ni, more preferably at least 60% (by mass). In some preferred embodiments, these alloys also contain at least 5%, preferably at least 10% Cr.

A "post-assembly" coating is applied onto three dimensional microchannel apparatus. This is either after a laminating step in a multilayer device made by laminating sheets or after manufacture of a manufactured multi-level apparatus such as an apparatus in which microchannels are drilled into a block. This "post-assembly" coating can be contrasted with apparatus made by processes in which sheets are coated and then assembled and bonded or apparatus made by coating a sheet and then expanding the sheet to make a three-dimensional structure. For example, a coated sheet that is then expanded may have uncoated slit edges. The post-assembly coating provides advantages such as crack-filling and ease of manufacture. Additionally, the aluminide or other coating could interfere with diffusion bonding of a stack of coated sheets and result in an inferior bond since aluminide is not an ideal material for bonding a laminated device and may not satisfy mechanical requirements at high temperature. Whether an apparatus is made by a post-assembly coating is detectable by observable characteristics such as gap-filling, crack-filling, elemental analysis (for example, elemental composition of sheet surfaces versus bonded areas) Typically, these characteristics are observed by optical microscopy, electron microscopy or electron microscopy in conjunction with elemental analysis. Thus, for a given apparatus, there is a difference between pre-assembled and post-assembled coated devices, and an analysis using well-known analytical techniques can establish whether a coating was applied before or after assembly (or manufacture in the case of drilled microchannels) of the microchannel device.

DESCRIPTION OF THE INVENTION

Microchannel Apparatus

Microchannel reactors are characterized by the presence of at least one reaction channel having at least one dimension (wall-to-wall, not counting catalyst) of 1.0 cm or less, preferably 2.0 mm or less (in some embodiments about 1.0 mm or less) and greater than 100 nm (preferably greater than 1 μm), and in some embodiments 50 to 500 μm. A reaction channel is a channel containing a catalyst. Microchannel apparatus is similarly characterized, except that a catalyst-containing reaction channel is not required. Both height and width are substantially perpendicular to the direction of flow of reactants through the reactor. Microchannels are also defined by the presence of at least one inlet that is distinct from at least one outlet—microchannels are not merely channels through zeolites or mesoporous materials. The height and/or width of a reaction microchannel is preferably about 2 mm or less, and more preferably 1 mm or less. The length of a reaction channel is typically longer. Preferably, the length of a reaction channel is greater than 1 cm, in some embodiments greater than 50 cm, in some embodiments greater than 20 cm, and in some embodiments in the range of 1 to 100 cm. The sides of a microchannel are defined by reaction channel walls. These walls are preferably made of a hard material such as a ceramic, an iron based alloy such as steel, or a Ni-, Co- or Fe-based superalloy such as monel. The choice of material for the walls of the reaction channel may depend on the reaction for which the reactor is intended. In some embodiments, the reaction chamber walls are comprised of a stainless steel or Inconel® which is durable and has good thermal conductivity. The alloys should be low in sulfer, and in some embodiments are subjected to a desulferization treatment prior to formation of an aluminide. Typically, reaction channel walls are formed of the material that provides the primary structural support for the microchannel apparatus. The microchannel apparatus can be made by known methods (except for the coatings and treatments described herein), and in some preferred embodiments are made by laminating interleaved plates (also known as "shims"), and preferably where shims designed for reaction channels are interleaved with shims designed for heat exchange. Of course, as is conventionally known, "reactors' do not include jet engine parts. In preferred embodiments, microchannel apparatus does not include jet engine parts. Some microchannel apparatus includes at least 10 layers laminated in a device, where each of these layers contain at least 10 channels; the device may contain other layers with less channels.

Figure 1:
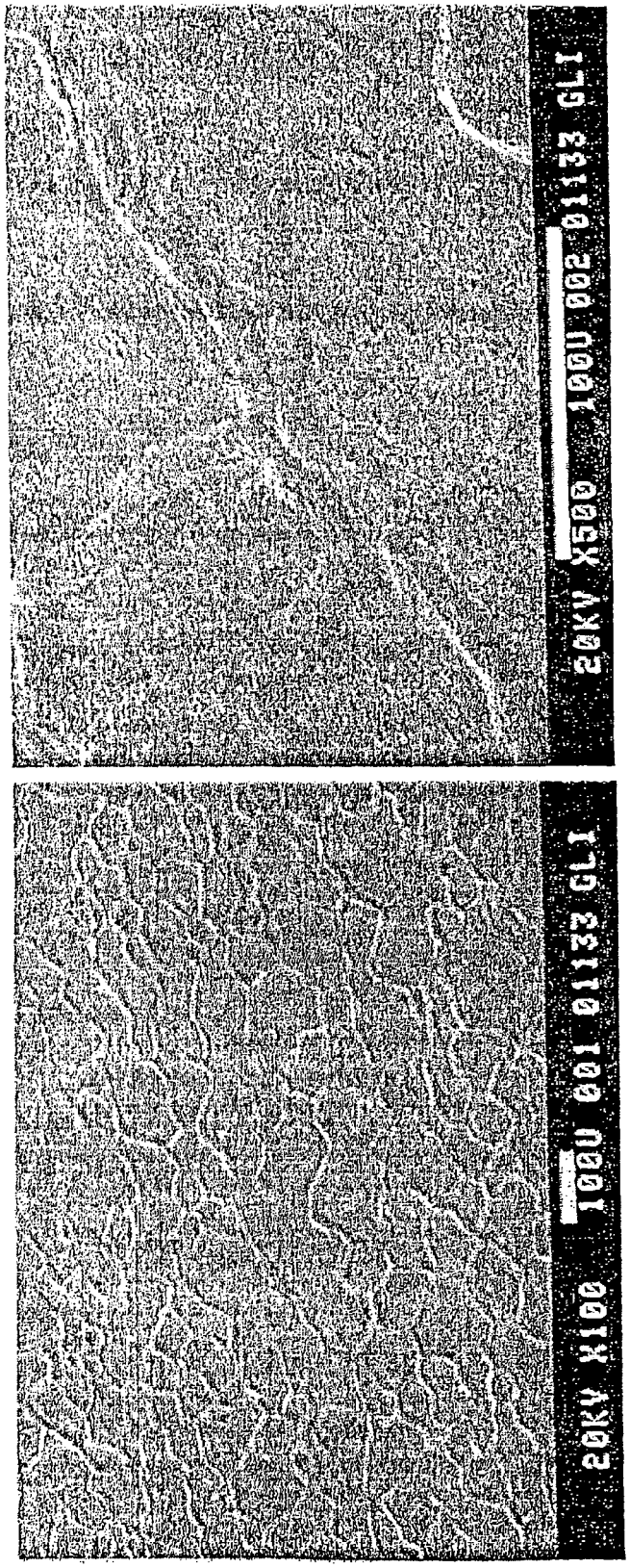
FIG. 1 is a photomicrograph of a dense and substantially defect-free alumina surface.
Figure 2:
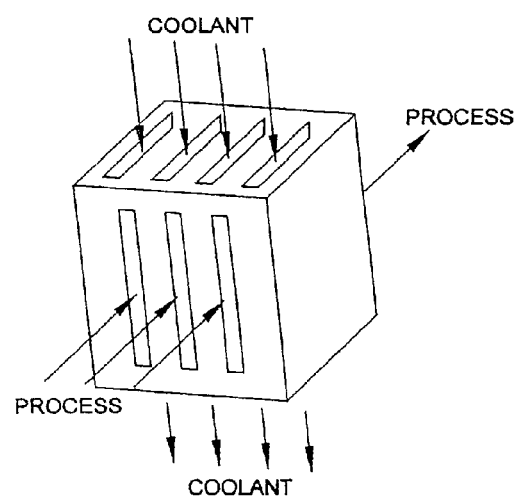
FIG. 2 is a simplified view of a microreactor with a set of reaction microchannels in a cross-flow relationship with a set of cooling microchannels.

FIG. 1 is a schematic and simplified view of one embodiment of a microchannel reactor in which reactant feed passes through a reaction microchannel (bottom) while coolant (in a cross-flow arrangement) flows through an adjacent heat exchanger (top). Microchannel reactors preferably include a plurality of microchannel reaction channels and a plurality of adjacent heat exchange microchannels. The plurality of microchannel reaction channels may contain, for example, 2, 10, 100, 1000 or more channels. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. During operation, the heat exchange microchannels (if present) contain flowing heating and/or cooling fluids. Non-limiting examples of this type of known reactor usable in the present invention include those of the microcomponent sheet architecture variety (for example, a laminate with microchannels) exemplified in U.S. Pat. Nos. 6,200,536 and 6,219,973 (both of which are hereby incorporated by reference). Performance advantages in the use of this type of reactor architecture for the purposes of the present invention include their relatively large heat and mass transfer rates, and the substantial absence of any explosive limits. Microchannel reactors can combine the benefits of good heat and mass transfer, excellent control of temperature, residence time and minimization of by-products. Pressure drops can be low, allowing high throughput and the catalyst can be fixed in a very accessible form within the channels eliminating the need for separation. Furthermore, use of microchannel reactors can achieve better temperature control, and maintain a relatively more isothermal profile, compared to conventional systems. In some embodiments, the reaction microchannel (or microchannels) contains a bulk flow path. The term "bulk flow path" refers to an open path (contiguous bulk flow region) within the reaction chamber. A contiguous bulk flow region allows rapid fluid flow through the reaction chamber without large pressure drops. In some preferred embodiments there is laminar flow in the bulk flow region. Bulk flow regions within each reaction channel preferably have a cross-sectional area of $5 \times 10^{-8}$ to $1 \times 10^{-2}$ m$^2$, more preferably $5 \times 10^{-7}$ to $1 \times 10^{-4}$ m$^2$. The bulk flow regions preferably comprise at least 5%, more preferably at least 50% and in some embodiments, at least 90% of either 1) the internal volume of the reaction chamber, or 2) a cross-section of the reaction channel.

In many preferred embodiments, the microchannel apparatus contains multiple microchannels, preferably groups of at least 5, more preferably at least 10, parallel channels that are connected in a common manifold that is integral to the device (not a subsequnetly-attached tube) where the common manifold includes a feature or features that tend to equalize flow through the channels connected to the manifold. Examples of such manifolds are described in U.S. patent application Ser. No. 10/695,400, filed Oct. 27, 2003 which is incorporated herein as if reproduced in full below. In this context, "parallel" does not necessarily mean straight, rather that the channels conform to each other. In some preferred embodiments, a microchannel device includes at least three groups of parallel microchannels wherein the channel within each group is connected to a common manifold (for example, 4 groups of microchannels and 4 manifolds) and preferably where each common manifold includes a feature or features that tend to equalize flow through the channels connected to the manifold. An aluminide coating can be formed in a group of connected microchannels by passing an aluminum-containing gas into a manifold, typically, the manifold will also be coated.

Heat exchange fluids may flow through heat transfer microchannels adjacent to process channels (preferably reaction microchannels), and can be gases or liquids and may include steam, liquid metals, oils, or any other known heat exchange fluids—the system can be optimized to have a phase change in the heat exchanger. In some preferred embodiments, multiple heat exchange layers are interleaved with multiple reaction microchannels. For example, at least 10 heat exchangers interleaved with at least 10 reaction microchannels and preferably there are 10 layers of heat exchange microchannel arrays interfaced with at least 10 layers of reaction microchannels. Each of these layers may contain simple, straight channels or channels within a layer may have more complex geometries.

The heat exchange fluid can be the reaction stream, either before it has passed through the catalyst contaning zone or after it has passed through the catalyst containing zone.

While simple microchannels can be utilized, the invention has advantages for apparatus with complex microchannel geometries. In some preferred embodiments, the microchannel apparatus includes one or more of the following characteristics: at least one contiguous microchannel has a turn of at least 45°, in some embodiments at least 90°, in some embodiments a u-bend, a length of 50 cm or more, or a length of 20 cm or more along with a dimension of 2 mm or less, and in some embodiments a length of 50-500 cm; at least 2 adjacent channels, having an adjacent length of at least one cm, are connected by plural orifices along a common microchannel wall where the area of orifices amounts to 20% or less of the area of the microchannel wall in which the orifices are located and where each orifice is 0.6 mm$^2$ or smaller, in some embodiments 0.1 mm$^2$ or smaller—this is a particularly challenging configuration because a coating should be applied without clogging the holes; or at least two, in some embodiments at least 5, parallel microchannels having a length of at least 1 cm, have openings to an integral manifold, where the manifold includes at least one dimension that is no more than three times the minimum dimension of the parallel microchannels (for example, if one of the parallel microchannels had a height of 1 mm (as the smallest dimension in the set of parallel microchannels), then the manifold would possess a height of no more than 3 mm). An integral manifold is part of the assembled device and is not a connecting tube. In some apparatus, a microchannel contains a u-bend which means that, during operation, flow (or at least a portion of the flow) passes in opposite directions within a device and within a contiguous channel (note that a contiguous channel with a u-bend includes split flows such as a w-bend, although in some preferred embodiments all flow within a microchannel passes through the u-bend and in the opposite direction in a single microchannel).

In preferred embodiments, the inventive apparatus (or method) includes a catalyst material. The catalyst may define at least a portion of at least one wall of a bulk flow path. In preferred embodiments, the surface of the catalyst defines at least one wall of a bulk flow path through which the mixture passes. During operation, a reactant composition flows through the microchannel, past and in contact with the catalyst. In some embodiments, a catalyst is provided as an insert that can be inserted into (or removed from) each channel in a single piece; of course the insert would need to be sized to fit within the microchannel. The catalyst can be a coating (such as a washcoat) of material within a microchannel reaction channel or channels. The use of a flow-by catalyst configuration can create an advantageous capacity/pressure drop relationship. In a flow-by catalyst configuration, fluid preferably flows in a gap adjacent to a porous insert or past a wall coating of catalyst that contacts the microchannel wall (preferably the microchannel wall in direct thermal contact with a heat exchanger (preferably a microchannel heat exchanger), and in some embodiments a coolant or heating stream contacts the opposite side of the wall that contacts the catalyst).

Other Substrates

In preferred embodiments, the inventive apparatus, catalysts or methods contain or use an aluminide coating on an interior microchannel. In preferred embodiments, the invention includes an aluminide layer, an alumina layer and a catalyst material coated onto an interior microchannel wall. However, in some embodiments, the invention includes a catalyst (or method of making a catalyst) in which an aluminide layer is formed on a substrate (catalyst support) other than a microchannel wall. Thus, in some embodiments, the invention includes a substrate, an aluminide coating over the substrate, and a catalyst material over the aluminide (preferably with an intervening alumina layer)—the substrate may have a conventional form such as pellets or rings; in some embodiments the substrate is not an expanded metal sheet. As in the case of microchannel walls, preferred catalyst supports are preferably formed of a Ni-, Co-, or Fe-based superalloy.

In some preferred embodiments, the catalyst comprises a metal, ceramic or composite substrate having a layer or layers of a catalyst material or materials deposited thereon. Preferably, the substrate is thermally conductive. A preferred substrate is a finned substrate that is characterized by the presence of fins (such as square-wave type fins) on the substrate's surface. These fins may, for example, take the form of fins etched in the wall of an integrated reactor or a finned insert (such as a flat metal plate with one grooved surface) that can be inserted into a combustion chamber of a microreactor. In some cases, the reactor can be refurbished by replacing an insert. One method of fabrication within a microchannel comprises the use of a slitting saw, partial etching using a photochemical process, or a laser EDM. This type of support provides numerous advantages including: high heat flux with short heat transfer distances, high surface area, and low pressure drop. Preferably, the support has a height (including fins) of less than 5 mm and preferably less than 2 mm and a fin-to-fin separation of 1000 μm or less, and in some embodiments, a fin-to-fin separation of 150 to 500 μm. Alternatively, the catalyst may take any conventional form such as a powder or pellet.

Metal Aluminide Layer

In some embodiments of the invention, at least a portion of at least one interior wall of a microchannel apparatus (preferably a microreactor) is coated with a layer of a metal aluminide (preferably nickel aluminide (NiAl)). It has been surprisingly discovered that an alumina wall coating formed by oxidizing a metal aluminide (NiAl in the examples) coating provides superior corrosion resistance as compared to either thermally grown oxide layer (grown from the substrate without forming an aluminide) or a solution deposited alumina layer. It is believed that exceptionally uniform and dense coatings result from solid state reaction of aluminum deposited at the surface from the gas phase and nickel diffusing out from the substrate towards the surface. In addition, nickel may be plated onto a metal that is not rich in nickel, such as stainless steel, to create a reactive surface for the aluminidization process. Nickel aluminide could also be deposited by supplying both Al and Ni precursors in the vapor phase concurrently or as a mixture. In a related aspect, a catalyst or catalyst intermediate is formed on substrates having such a nickel aluminide surface. Of course, the invention also includes methods of making catalysts or microchannel apparatus comprising coating a substrate (preferably a Ni-based alloy) with chemically vapor deposited aluminum that is simultaneously and/or subsequently converted to an aluminide (such as NiAl).

A NiAl layer can be formed by exposing a Ni-based alloy to $AlCl_3$ and $H_2$ at high temperature, preferably at least 700° C., in some embodiments 900 to 1200° C. Aluminum is deposited at the surface as a result of the reaction between $AlCl_3$ and $H_2$. At temperature, Ni from the substrate would diffuse towards the surface and react with the aluminum to form a surface layer of nickel aluminide. The Ni source could be Ni in a Ni-based alloy substrate, an electrolytically plated Ni layer or a vapor deposited Ni layer that can be deposited over a substrate prior to aluminidization. It is believed that other metal aluminides (such as Co or Fe) could be formed under similar conditions.

Preferably, the aluminidization process is conducted with good control of flow to the device through a manifold. For example, good control can be obtained by passing flow into microchannels through a leak-free manifold. Preferably the aluminidization process is carried out at 100 Torr (2 pounds per square inch absolute, psia) to 1800 Torr (35 psia), more preferably between 400 Torr (8 psia) and 1300 Torr (25 psia).

In preferred embodiments, nickel aluminide contains 13 to 32% aluminum, more preferably to 32%; and still more preferably consists essentially of beta-NiAl. If Al falls significantly below the 13% weight % level of the gamma-prime phase, it may be expected to negatively affect the quality of the thermally-grown alumina scale.

In some embodiments, the metal aluminide layer has a thickness of 1 to 100 micrometers (μm); in some embodiments a thickness of 2 to 50 μm; and in some embodiments a thickness of 5 to 25 μm. In some embodiments, the aluminide layer is completely oxidized; however, this is generally not preferred.

The metal surface upon which the metal aluminide is formed is preferably substantially free of oxides. Optionally the surface can be cleaned, polished, or otherwise treated to remove such oxides if any are present.

A reactor can be formed by a catalyst that is disposed as a coating on an internal wall (where the walls can be simple walls or shaped walls). Alternatively, or in addition, inserts such as fins, plates, wires, meshes, or foams can be inserted within a channel. These inserts can provide additional surface area and effect flow characteristics. An aluminization process can be used to fix inserts onto a wall of a device (such as a reactor); the resulting aluminum layer (or aluminum oxide, or aluminum, or metal aluminide, or a mixture of these) fills some voids and greatly improves thermal conduction between the insert and device wall (such as reactor wall).

Effect of Oxide Presence During Aluminidization Process

An Inconel™ 617 coupon was heat treated in air at 400° C. for 1 hr to purposely grow some native oxide of chromia before being aluminized. A thin dotted line of inclusions in the aluminide is observed in the coupon with native oxide before aluminization. Such a line of inclusions could become a weak point in terms of adhesion.

In early attempts at the aluminidization of a multichannel device, it was discovered that the channels nearest the gas inlet (that is, the inlet for the aluminum compounds) showed the most inclusions while the channels furthest away showed the least. This is believed to have been caused by surface oxides in the tubing or manifolding in the pathway of the aluminum compounds prior to the microchannels. The presence of surface oxide in the tubing was confirmed by EDS. To avoid these defects, care should be taken to avoid the use of components that have surface oxides in the aluminidization process, especially surface oxides along the fluid pathway (that is, the pathway carrying aluminum compounds) leading to a microchannel device. In some preferred techniques, the tubing and/or other fluid pathways are subjected to a treatment to remove surface oxides (brightened), such as by a hydrogen treatment. Of course, before aluminidization, the microchannels may also be subjected to a treatment for the removal of surface oxide.

In preferred embodiments, the aluminide layer and the interfaces of the aluminide layer with the alloy substrate and an oxide layer (if present) is preferably substantially without voids or inclusions that are larger than 10 μm, more preferably substantially without voids or inclusions that are larger than 3 μm. "Substantially without voids or inclusions" excludes coatings having numerous (that is, more than about 5 large or a single very large) defects in 50 μm of length along a channel, but wouldn't exclude a structure that shows a small number of isolated defects.

Thermally Grown Oxide

A metal aluminide layer or more preferably a NiAl layer, can be heated in the presence of oxygen or other oxidizing gas to grow a layer of aluminum oxide. It was surprisingly discovered that when the surface was heated to the treatment temperature in the absence of $O_2$ or other oxidizing gas prior to the oxide growth at temperature, a significantly improved oxide coating resulted. The oxide layer grown by heating the surface to the treatment temperature in the presence of oxygen exhibited spalling while the layer grown by heating the surface from ambient temperature to the treatment temperature in the absence of oxygen did not. Oxygen can be substantially excluded from the heat up step of the heat treatment process.

A convenient and preferred method of excluding oxygen from the surface while heating the surface from ambient temperature to treatment temperature involves exposure to hydrogen. The hydrogen effectively reduces the oxidizing power of the atmosphere during heat up to prevent premature growth of the oxide scale. Other gases that reduce the oxidizing power of the gas, such as NH3, CO, CH4, hydrocarbons, or the like, or some combination of these could also be used. These gases could be used in combination with inert gases, such as N2, Ar, He, Ne, or combinations of these.

The oxide layer is formed by exposing the surface to an oxidizing atmosphere at the treatment temperature. The oxidizing gas could be air, diluted air, oxygen, $CO_2$, steam, NOx or any mixture of these gases or other gases that have substantial oxidizing power. The temperature of oxide growth is at least 500° C., preferably at least 650° C. The surface can be exposed to the treatment condition in stages of different temperatures, different oxidizing powers, or both. For example, the surface could be treated at 650° C. for a time and then heated to 1000° C. and kept at 1000° C. for an additional time. Such controlled and staged surface treatment can generate a surface structure of a desired morphology and composition.

Superior oxide coatings result from preheating to about 1000° C. (in some embodiments at least 900° C.) under an inert, or preferably, a reducing atmosphere such as a $H_2$-containing atmosphere (preferably at least 1000 ppm $H_2$, in some embodiments 1 to 100% $H_2$). Preheat under a reducing atmosphere was observed to produce superior oxide coatings with little or no spalling. It is believed that this control of preheat conditions results in superior coatings because it minimizes the formation of nickel oxide or mixtures of oxides. Great care must be taken selecting a truly "inert" atmosphere because atmospheres conventionally considered as inert atmospheres yield inferior results. That is because nickel oxide can theoretically form even at $10^{-10}$ atm oxygen and chromia at $10^{-21}$ atm oxygen; such extreme levels of purity are not available in commercially available gases. Therefore, reducing atmospheres are preferred.

Conventional wisdom is that the higher the temperature, the faster the oxidation rate. Surprisingly, we discovered that the oxide grew faster at 1000° C. than at 1050° C. One possible explanation is that the high temperature oxide could be denser, thus discouraging faster growth. The lower temperature oxide could be more porous thus allowing faster oxide growth. On the other hand, too high a temperature will promote interdiffusion between the aluminide layer and the substrate, and the aluminide will disappear into the bulk of the alloy. Therefore, the thermally-grown oxide is preferably conducted in the temperature range of 1000 to 1100° C., more preferably 1025-1075° C. In the presence of excess oxygen, for example flowing air, the oxidation treatment is preferably conducted for 30 to 6000 min, more preferably 60 to 1500 min.

It should be recognized that the term "alumina" can be used to refer to a material containing aluminum oxides in the presence of additional metals. In the descriptions herein, unless specified, the term "alumina" encompasses substantially pure material ("consists essentially of alumina") and/or aluminum oxides containing modifiers.

Thinner layers are less prone to cracking; therefore, the thermally-grown oxide layer is preferably 10 μm thick or less, more preferably 5 μm thick or less, more preferably preferably 1 μm thick or less, and in some embodiments is 0.1 μm to 10 μm thick, in some embodiments is 0.2 μm to 5 μm thick, in some embodiments is 0.5 μm to 3 μm thick. Typically, these thicknesses are measured with an optical or electron microscope. Generally, the thermally-grown oxide layer can be visually identified; the underlying aluminide layer is metallic in nature and contains no more than 5 wt % oxygen atoms; surface washcoat layers may be distinguished from the thermally-grown oxide by differences in density, porosity or crystal phase.

The aluminized surface can be modified by the addition of alkaline earth elements (Be, Mg, Ca, Sr, Ba), rare earth elements (Y, La, Ce, Pr, Nd, Pm, Sm, Eu, Gd, Th, Dy, Ho, Er, Tm, Yb, Lu) or combinations of these. The addition of these elements is followed by a reaction with an oxidizing atmosphere to form a mixed oxide scale. When the modifying element is La, for example, the scale contains LaAlOx, lanthanum aluminate. In some embodiments, a stabilized alumina surface can be formed by adding a rare earth element such as La.

Flow Rates

The aluminide layer is preferably formed by reacting a surface with a gaseous reactant mixture under dynamic flow conditions. The aluminum needed for aluminide formation can be deposited in a microchannel by flowing $AlCi_3$ and $H_2$ into a microchannel. In a multichannel device, the Al can be deposited only on selected channels (such as by plugging certain channels to exclude the aluminum precursors during a CVD treatment). The aluminum layer can also be applied onto selected portions of a microchannel device by controlling relative pressures. For example, in a microchannel device that contains at least two channels separated by a wall and in which the two channels are connected to each other via orifices in the wall, $AlCl_3$ flows through a first channel while $H_2$, at a higher pressure, flows through a second channel and through the orifices into the first channel.

Static gas treatments can be conducted by filling the desired areas with the reactive gases with interim gas pumping if needed.

Based on a detailed analysis of the tested devices, the following thresholds were established:

Wall Shear Stress: To ensure drag forces do not impair the formation of aluminization coating, the wall shear stress should not exceed 50 Pa if the aluminization gases are flowing through a jet orifice. Allowable wall shear stress should not exceed 200 Pa if the aluminization gases are not impinging on the wall of a microchannel as through a jet orifice.

Wall Dynamic Pressure: To ensure momentum impact erosion does not impair the adequate formation of aluminization coating, the wall dynamic pressure should not exceed 10 Pa if the aluminization gases are flowing through a jet orifice. Substantially higher wall dynamic pressure is allowed in the absence of a jet orifice. Allowable wall dynamic pressure should not exceed 100 Pa if the aluminization gases are not impinging on the wall of a microchannel as through a jet orifice.

Practical Application

The metrics presented above are used to determine the flow configuration and individual inlet flow rates that will imply good aluminization treatment from a fluidics standpoint. Generally there is a combination of possible input and output flow paths for a device. CFD predictionss are used to determine those inflow/outflow combinations and the individual inlet flow rates that will result in globally maintaining the wall shear stress below 50 Pa, and the wall dynamic pressure below 10 Pa throughout the entire device if flow of at least one of the aluminization gases is through a jet orifice. The maximum allowable inlet flow rate that satisfies these two criteria and the associated flow configuration becomes the recommended procedure for aluminizing the device based on the metrics developed here. Examples of the aluminide coating resulting from this guidance produced aluminide coatings without visual defects.

Masking

The aluminizing processes discussed above produce aluminide coatings throughout a channel. However, it is theoretically possible to selectively coat portions of a channel by masking off sections of a channel. This might be done by masking portions of a sheet with a refractory material and then laminating the masked sheet into a laminate. After aluminization the mask could be removed, such as by burning. Possible refractory materials might include Mo, diamond, and graphite.

Figure 3:
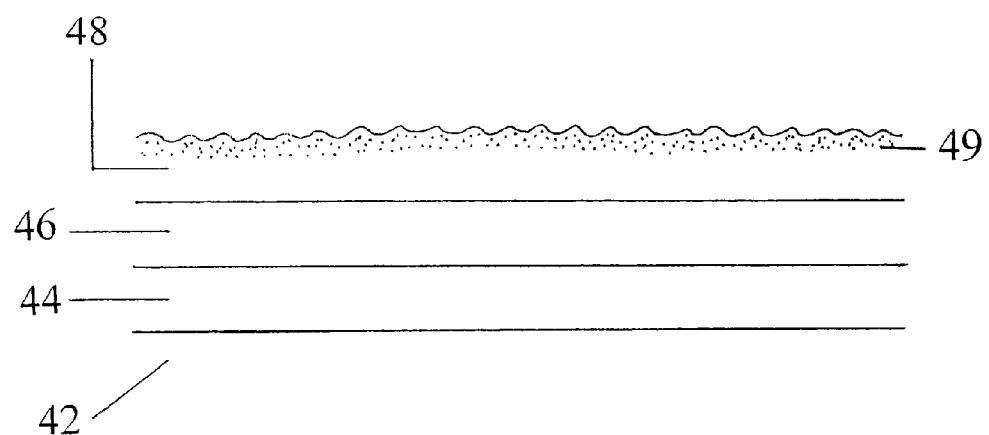
FIG. 3 is a schematic cross-sectional illustration of an aluminide coated substrate.

FIG. 3 schematically illustrates an application in which a metal substrate 42 has an optional nickel-containing layer (such as a nickel strike) 44, a layer of aluminide 46, and a layer of alumina 48. In preferred embodiments, the outermost layer further comprises an additional catalytically active material 49.

Catalyst Coatings

Catalysts can be applied directly deposited onto an oxide using techniques that are known in the art such as chemical vapor deposition (CVD) and electroless plating. Impregnation with soluble aqueous salts is preferred. Pt, Rh, and/or Pd are preferrred in some embodiments. Typically this is followed by heat treatment and activation steps as are known in the art. Salts which form solutions of pH>0 are preferred.

The catalytically-active material of the present invention is not particularly limited. Among preferred catalytic materials of the present invention are the so-called high-temperature catalysts, i.e., those comprising noble metals, preferably catalyst materials comprising at least one metal selected from the group consisting of Pt, Pd, Rh, Ni, Co, Ag, Au, Ir and Ru. For oxidative dehydrogenation, preferred catalytically-active materials of the present invention also include the so-called low-temperature catalysts, which may comprise at least one oxide or phosphate of a metal selected from the group consisting of Li, Mo, V, Nb, Sb, Sn, Zr, Cr, Mg, Mn, Ni, Co, Ce, rare-earth metals (such as Sm), and mixtures thereof. The low or high temperature catalyst may contain additional components such as alkalai or alkaline earth promoters, or metals such as Cu, Ag, or Sn. Catalysts can be, for example, vanadia dispersed on alumina, or platinum on alumina. For oxidative dehydrogenation (ODH), Pt, Sn, Cu and combinations thereof are especially preferred. In some preferred embodiments, the Pt: Sn ratio is in the range of 1 to 4. more preferably 2.1-2.7, still more preferably 2.3 to 2.5. Surprisingly, it was discovered that superior results could be obtained in a microchannel with these relatively high Pt::Sn ratios. Lanthanum manganate is another preferred catalytic material for ODH. Pt is a preferred catalyst for combustion.

For flat or substantially flat substrates (such as a flat microchannel wall), catalyst can be characterized by the amount of catalytic material on a geometric surface area; that is, an area that can be measured with a ruler. In some preferred embodiments, the catalyst contains at least 0.3 mg/cm$^2$ catalytic material, in some preferred embodiments at least 0.6 mg/cm$^2$ catalytic material, and in some embodiments 0.2 to 2 mg/cm$^2$ catalytic material.

Unless otherwise specified, elemental analyses of wall coatings should be determined using energy dispersive spectroscopy (EDS) at 20 kV excitation energy (at 100×, or if 100× is larger than the area available, then the largest available area for SEM, recognizing that some modifications may be required if such measurment conditions are impracticable for particular systems). As is well-known, this technique measures the surface composition, as well as some thickness below the surface.

Some catalysts of this invention have a surface area, as measured by $N_2$ adsorption BET, of 10 m$^2$/g or less, and in some embodiments a surface area of 5 m$^2$/g or less.

Electroless Plating

The use of electroless plating, where a chemical reaction is used to plate a metal along the reactor walls may also create a catalyst coating. It should be noted that the electroless plating solution is preferably filled (to the desired height) within the channels prior to the initiation of the reaction. The solution could be introduced at room temperature or below and then heated to the requisite plating temperature. Conversely, the plating reaction should preferably be minimized before draining the fluid from the microchannel or else a non-uniform coating could be obtained along the channel length and from channel to channel. Specifically, a thicker coating would be expected near the bottom of the channel as the fluid will remain in contact with the channel walls near the bottom of the microchannel for substantially more time during drying.

As is known, an electroless plating solution comprises a metal compound and a reducing chemical. A complexing agent may be added to prevent reduction of the metal ions in solution. In some embodiments, the reduction process may be catalyzed by a small amount of catalytic metal ions. The microchannel walls could be ceramic, metal, alumina-coated aluminide, etc. Preferred metals for the electroless deposition include Cu, Ni, Fe, Co, Au, Ag, Pd, Pt, Sn, Ir, Rh and combinations thereof. After plating, the residual solution could be drained out.

Reactions

The coated microchannel apparatus is especially useful when used with a surface catalyst and at high temperature, for example, at temperatures above 180° C., above 250° C., above 500° C., in some embodiments 700° C. or higher, or in some embodiments 900° C. or higher.

In some aspects, the invention provides a method of conducting a reaction, comprising: flowing at least one reactant into a microchannel, and reacting the at least one reactant in the presence of a catalyst within the microchannel to form at least one product. In some embodiments, the reaction consists essentially of a reaction selected from: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift. Combustion is another preferred reaction. Hydrocarbon steam reforming is especially preferred (such as methane, ethane or propane steam reforming).

In some preferred embodiments, Gas hourly space velocity (GHSV) of the inventive methods may range from 1,000 $h^{-1}$ to 10,000,000 $h^{-1}$ based on reactor volume, or 1,000 ml feed/(g catalyst)(hr) to 10,000,000 ml feed/(g catalyst)(hr). In other preferred embodiments, GHSV is at least 10,000 $h^{-1}$ or at least 10,000 ml feed/(g catalyst)(hr); more preferably at least 100,000 $h^{-1}$ or at least 100,000 ml feed/(g catalyst)(hr); more preferably at least 500,000 $h^{-1}$ or at least 500,000 ml feed/g catalyst; more preferably at least 1,000,000 $h^{-1}$ or at least 1,000,000 ml feed/(g catalyst)(hr).

Oxidative Dehydrogenation (ODH)

This invention discloses methods for the oxidative dehydrogenation of alkane(s) and/or aralkane(s) to alkene(s), alkadiene(s) and/or aralkene(s). The hydrocarbon may be any alkane or aralkane of $C_2$ up to $C_{20}$. Examples of alkane include ethane, propane, isobutane or butane or higher alkanes including up to $C_{20}$ linear and branched alkanes; examples of aralkane include ethylbenzene; examples of alkene for the purpose of this invention include ethylene, propylene and also alkadienes such as butadiene; examples of aralkene include styrene. Preferred examples of hydrocarbons are $C_2$-$C_{18}$ alkanes, preferably $C_2$-$C_{10}$ alkanes, isobutane, propane, ethane, ethylbenzene, or $C_{10}$-$C_{15}$ alkanes such as could be used for making detergent alcohols. The alkanes can be linear, branched and cyclic. Hydrocarbons can be obtained commercially either in pure form or in mixtures. Hydrocarbons can also be derived from other reactions, and the output of these reactions used with or without an intervening purification step. Systems of the invention can be described as including apparatus and/or catalyst in combination with reactants and/or products. By "including" is meant "comprising", however, it will be understood that any of the terms "consists of" or "consists essentially of", may alternatively be used to describe more limited aspects of the invention. Additionally, any of the individual components (such as ethane, for example) may preferably be present in at least 20% purity (based on carbon atoms), or at least 50%, or at least 90%, or 100% purity.

The source of oyxgen is preferably a gas capable of providing molecular oxygen, which may conveniently be molecular oxygen or air. Oxygen ($O_2$) is preferred over air, and in preferred embodiments, the $O_2$:$N_2$ ratio (or the $O_2$:diluent ratio) entering a reaction chamber is one or greater, more preferably at least 3, and still more preferably at least 10. In some embodiments, the hydrocarbon/oxygen ($O_2$) ratio in the feed preferably is 2.0 or more, in some embodiments between 1 and 3, in some embodiments 1.8 or more, in some embodiments 2.5 or more.

For ODH of ethane to ethylene the ethane:$H_2$ feed ratio is preferably in the range 1:0 to 1:1, preferably 1:0.2 to 1:0.6, most preferably 1:0.25 to 1:0.5, and the ethane:O2 feed ratio is preferably in the range 1.8-4.0 and in some embodiments 1:0.25 to 1:0.5 depending on the overall reaction selectivities and conversion. The $H_2$:$O_2$ ratio is preferably in the range of 0.5 to 3.0.

An alternate microchannel design for ODH reactions is the close coupling of an endothermic reaction in an adjacent microchannel. The placement of an endothermic reaction such as a steam reforming reaction next to the exothermic ODH reaction allows for the highest rate of heat transfer. An endothermic reaction that can be placed in the adjacent microchannel is alkane cracking. A typical heat flux for convective cooling in a microchannel reactor is on the order of 1-5 W/cm2. The incorporation of a simultaneous endothermic reaction to provide an improved heat sink will enable a typical heat flux of roughly an order of magnitude above the convective cooling heat flux.

Reactor designs for ODH may include distributed injection of oxidant. Reactor designs for ODH are described in U.S. Pat. No. 7,402,719, incorporated herein by reference as if reproduced in full below.

In some preferred embodiments, an adjacent channel (or channels) carries an oxygen source that is distributed over a length of the reaction microchannel(s). In some preferred embodiments, oxidant enters a reaction chamber at more than 3 points along the chamber length. In some embodiments where a reaction chamber is defined by plural walls (typically four), there are oxidant inlets on one, or more than one, wall of the reaction chamber.

Preferred temperature ranges of the ethane ODH process in the present invention include: a temperature ranging from 335 to 1100° C., more preferably 500-1050° C., and in some embodiments about 700 to about 1000.

The amount of heat that can be transferred through a plane separating the process reaction chamber from a heat exchanger is a function of the method of heat transfer. For convective heat transfer from a hot fluid in a heat exchange channel to a dehydrogenation reaction chamber, the amount of heat (as defined as Watts per square cm of reaction chamber wall area that is adjacent to the heat exchanger) transferred for a gaseous heat transfer fluid is preferably at least 1 W/cm$^2$ and may be up to about 15 W/cm$^2$. For a liquid heat transfer fluid used in convective heat transfer, higher heat transfer fluxes are achievable and may range from at least 1 W/cm$^2$ to about 30 W/cm$^2$. For conductive heat transfer from an exothermic reaction, much higher rates of heat transfer are attainable and heat flux may range from about 10 W/cm$^2$ to about 100 W/cm$^2$. These defined ranges of heat fluxes are for steady-state operation and average over the area of a process reaction chamber wall that is adjacent to a heat exchanger; or, in a reactor with multiple channels (more than two channels), an average over the areas of all dehydrogenation reaction chambers adjacent to heat exchanger(s) in all the channels in operation.

Figure 4:
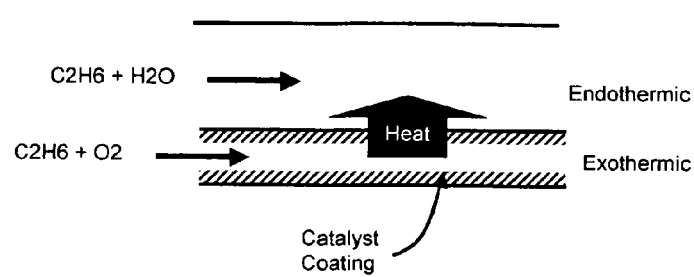
FIG. 4 is a schematic illustration of a microchannel system in which heat from a reaction microchannel is transferred to an adjacent endothermic reaction.

In some preferred embodiments, a portion of a reactor with catalyst (a first reaction chamber) is in heat exchange communication with a portion of the reactor without catalyst (an adjacent heat exchanger), and ethane is cracked in the portion of the reactor without catalyst. In preferred embodiments, the residence time of the reactant gas in the portion of the reactor containing the catalyst is less than the residence time of the reactant gas in the adjacent heat exchanger. In some preferred embodiments, the residence time in the first reaction chamber is less than half (in some embodiments 20% or less) of the residence time of gas in the adjacent heat exchanger. An schematic illustration is shown in FIG. 4.

In some embodiments, less than 50% of the area of a reaction channel is coated with a catalyst wall coating. In some embodiments, the ODH reaction is conducted at a temperature above 700° C., and less than 50% of the area of a reaction channel that is at a temperature above 700° C. is coated with a catalyst wall coating.

Preferably, selectivity to carbon oxides (on a carbon atom basis) is less than 40%, more preferably less than 20% (in some embodiments, in the range of 20% and 5%), and even more preferably less than 5%. In less preferred embodiments, selectivity to carbon dioxide (on a carbon atom basis) is less than 40%, more preferably less than 20% (in some embodiments, in the range of 20% and 5%), and even more preferably less than 5%.

The $CO/CO_2$ ratio is indicative of the efficiency of the ODH process; low ratios indicate that oxygen was unavailable for ODH and was consumed primarily for combustion. In a microchannel reactor we are capable of obtaining CO to $CO_2$ ratios in excess of those predicted at equilibrium for the particular gas mixture in question when the reactor temperature is below the temperature at which the formation of CO is favoured over the formation of $CO_2$. For example when the ratio of C3 to O2 is 2:1 and the total pressure is 10 psig the temperature at which CO and $CO_2$ are at a 1:1 ratio at equilibrium is approximately 660° C. below this temperature the formation of CO is strongly favored by thermodynamics.

For a given mixture at a given operating pressure the CO:CO2 ratio obtained in a microchannel reactor when the temperature is below that where the formation of CO is thermodynamically favorable and is preferably at least 2.4:1 or more preferably 2.76:1 or more preferably 4.6:1 or even more preferably 10:1.

At equal peak temperatures the volumetric productivity as defined by the grams of target olefin (for example propylene) produced per unit volume of reaction chamber (reaction chamber is that portion of a channel where catalyst is present either as flow-by or flow-through) per hour is greater in a microchannel than in a conventional reactor. As shown in the examples, when the C3 to O2 ratio was 1:1 and the peak temperature was about 625° C. the productivity of the microchannel is greater than that of a quartz tube by a factor of 1.9. Volumetric productivity of a microchannel reactor performing propane ODH could in one instance be 15 g/ml/hr or preferably 30 g/ml/hr or more preferably 60 g/ml/hr or even more preferably 120 g/ml/hr or more, in some embodiments productivity is 15 to about 150 g/ml/hr.

In the case of ethane ODH, at equal average temperatures, the productivity as defined by the grams of target olefin (for example ethylene) produced per unit mass of catalyst of catalyst per hour is greater in the microchannel than in a conventional reactor. Productivity of a microchannel reactor performing ethane ODH is preferably at least 270 g/g/hr or more preferably at least 600 g/g/hr or more preferably 1200 g/g/hr or even more preferably at least 2400 g/g/hr.

In some preferred embodiments, $H_2$ is recovered from product gas and at least a part of the recovered $H_2$ is fed back to the reactor.

The percent conversion of hydrocarbon (in a single pass) is preferably 50% or higher, more preferably about 70% or higher, even more preferably 80% or higher. The level of percent selectivity to desired product or products in the case where more than one valuable alkene can be formed, is preferably at least 50% preferably at least 60%, and in some embodiments 50 to about 93%. The yield of product alkene or alkenes and/or aralkene in mol % per cycle is preferably greater than 10%, and more preferably greater than 20%. The total yield of product alkene or alkenes and/or aralkene(s), in mol %, is preferably greater than 50%, more preferably greater than 75%, and most preferably greater than 85%. The specified levels of conversion, yield and selectivity should be understood as exemplary and include all values such as yield per cycle of at least 15%, at least 25%, etc. as well as ranges such as 10 to 30%. The ranges and conditions can be further understood with reference to the Examples and the invention includes all ranges and minimum levels of conversions, etc. described therein. It is also envisioned that routine testing and experimentation, in view of the teachings provided herein, will reveal superior results and it is therefore intended that this disclosure be broadly interpreted to include descriptions of numerous levels (and ranges) of conditions and results.

For ODH of ethane, selectivity to ethene (ethylene) is preferably 80% or more, more preferably 85% or more, and in some embodiments in the range of 80 to about 93%, more preferably 84 to about 93%. In some embodiments, the sum of ethene and ethyne selectivity is preferably 80% or more, more preferably 85% or more. These selectivities are based on a single pass through a reactor.

Oxygen conversions of greater than 90%, greater than 95%, most prefereably greater than 99% can be achieved with gas flow rates of greater than 10,000 h-1, greater than 100,000 $h^{-1}$ and even greater than 1,000,000 h-1 in an oxidative dehydrogenation process in a microchannel reactor.

EXAMPLES

Direct Coating Methodology:

On a heat treated aluminidized alloy 617 coupon, aqueous metal solution used as precursors was directly applied at room temperature. For the Pt system, 9% (atomic Pt) of tetraammineplatinum hydroxide solution was used. After each coating, the coupon was calcined at 450° C. for 1 hr in air. Once the desired weight gain was achieved, the coupon was calcined at 850° C. for 4 hrs in air for the final calcination. For a Re—Pt system, perrhenic acid or ammonium perrhenate can be used and was coated first before Pt was applied.

Corrosion Protection

Samples of Inconel™ 617 were corrosion tested with and without a protective aluminide coating. The aluminide coated sample was made by forming a layer of aluminide and heating under H2 atmosphere and then exposing to air at 1050° C. Both samples were corrosion tested at 960° C. and 17% water, 2.5% $O_2$ for 1000 hours. The uncoated sample showed pitting after 100 hours of testing. In contrast, the aluminide/alumina coated sample showed no observable change after 1000 hours of corrosion testing. See FIG. 1, which shows no damage to the alumina layer. The grain boundaries shown in the figures were also present prior to the corrosion testing. Further corrosion testing to 4400 hours also showed no damage to the coating.

Catalyst Preparation for Oxidative Dehydrogenation

Catalysts were prepared by dip coating heat treated aluminized Inconel™ 617 coupons into precursor solution followed by calcination. Precursors included tetraammineplatinum hydroxide (Alfa Aesar), tin 2-ethylhexanoate (Sigma), tetrabutyltin (Sigma). Catalyst metal was applied directly on the dense alumina layer on the coupon substrate. For Pt—Sn catalyst, the order of coating precursors may be important for activity. Preferably, Pt precursor is coated before Sn precursor is applied to obtain a higher catalytic activity (selectivity at given conversion) than Sn coating before Pt coating. Since tin 2-ethylhexanoate is a dense liquid, it was diluted with acetone to ~30 wt % tin 2-ethylhexanoate solution and used for coating. Tetraammineplatinum hydroxide solution was dip coated onto the coupon and calcined at 450° C. for 30 min in air (intermediate calcinations). This step was repeated until a desired weight gain was observed. Tin solution was coated onto the coupon and calcined between 450-550° C. for 30 min to 1 hour in air. This step was repeated until a desired weight gain was observed. After the desired weight was gained, the catalyst coupon was calcined at 850° C. for 4 hours at 5° C./min in air finally.

For $LaMnO_3$ synthesis, lanthanum nitrate (Aldrich), manganese nitrate (Alfa Aesar) were dissolved in DI water at stoichiometry ratio. After the solution was dip coated on the heat treated aluminized alloy 617 coupons, it was calcined at 450° C. for intermediate calcinations. After attaining the desired loading, it was calcined at 900° C. for 4 hours at 5° C./min. The X-ray diffraction pattern showed that the major phase was $LaMnO_3$.

The coupons were inserted into the middle of a microchannel test reactor leaving a rectangular 0.050 cm gap on each of the two major surfaces of the coupon. Prior to insertion fo the coupon, the interior of the test reactor was aluminized and heat treated to grow a dense alumina layer. The heat treatment is carried out as follows: Heat up in hydrogen to 1050° C. at 3.5° C./min, isothermally held under Ar at 1050° C. for 1 hour, isothermally held at 1050° C. under 21% $O_2$/Ar for 10 hours, and cooled down to room temperature at 3.5° C./min under 21% $O_2$/Ar. Reactants flow by the coupon through this gap. The coupons were 0.327 inch wide, 0.115 inch thick, and 1.5 inch long. The coupon temperature was monitored by thermocouples placed 0.25 inches from the top and bottom of the coupon. The test reactor did not have a heat exchanger since it was a single channel device, the area surrounding the test coupon was wrapped in a heating element, sections of the reactor on either side of the heating element were unheated and cooling was rapid.

The reactor was operated at temperatures in the range of 600 to 1050° C. Contact time was varied between 5 and 100 ms. The ethane:oxygen ratio was varied between 2 and 10, and the $H_2$:$O_2$ ratio of the feed kept at 2. Most of the catalyst testing was performed at an ethane:oxygen ratio of 3 and a contact time of 40 ms, and temperature in the range of 800 to 950° C.

Figure 5:
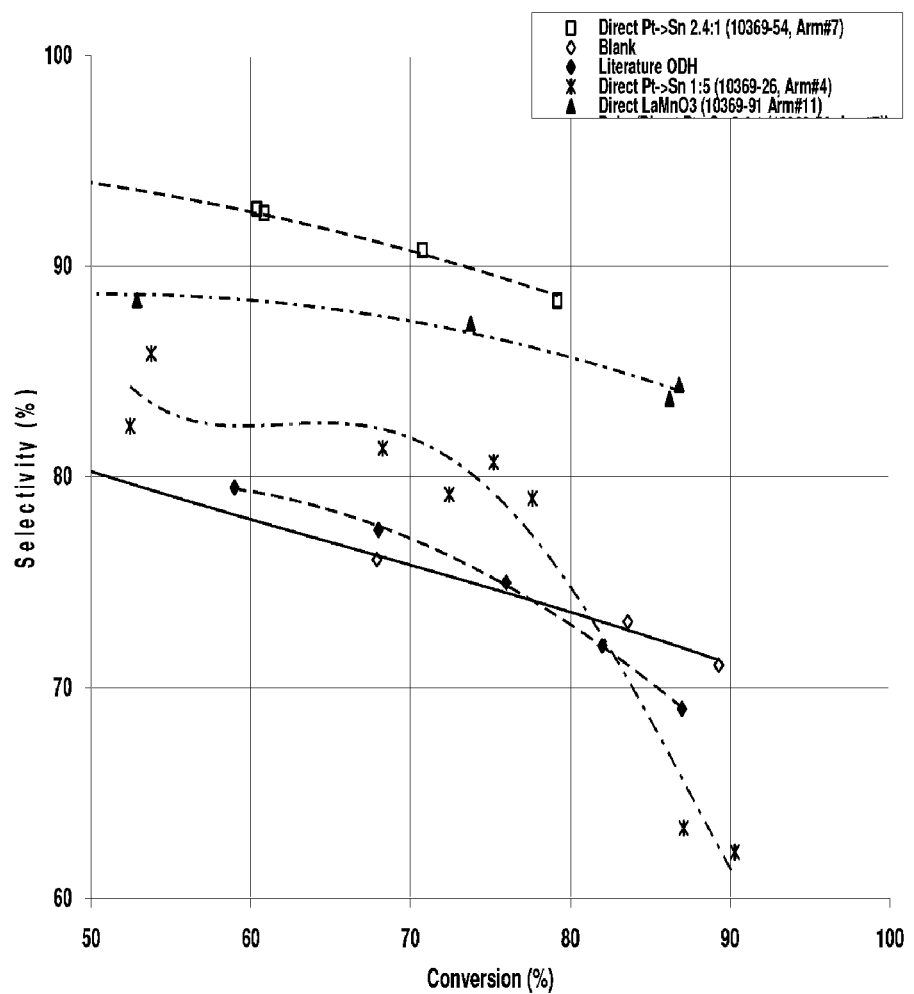
FIG. 5 is a plot of Selectivity vs. conversion for Pt—Sn catalysts at 2.4:1 and 1:5 Pt:Sn loadings; also for LaMnO$_3$ catalyst. The Pt:Sn=2.4:1 catalyst and LaMnO3 catalyst were tested under 3:2:1 ethane:hydrogen:oxygen at 40 ms while the Pt:Sn=1:5 catalyst is tested under 4:2:1 ethane:hydrogen:oxygen at 50 ms. The Literature value is from BP Patent WO 02/04389.

Tested samples included a catalyst with a Pt:Sn ratio of 2.4:1 and a catalyst with a Pt:Sn ratio of 1:5. Reactivity results are shown in FIG. 5. SEM of the high loading Sn catalyst showed large spherical Sn particles and some smaller Pt/Sn particles about 2 μm in size. See FIG. 6.

Pt/Sn catalyst tested for 185 hours showed no degradation of catalyst performance.

Figure 6:
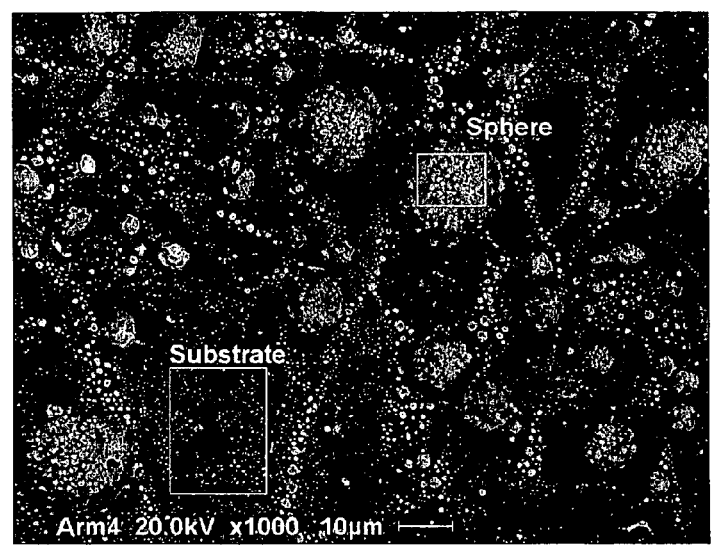
FIG. 6 is an SEM photomicrograph of a Pt:Sn=1:5 catalyst.
Figure 7:
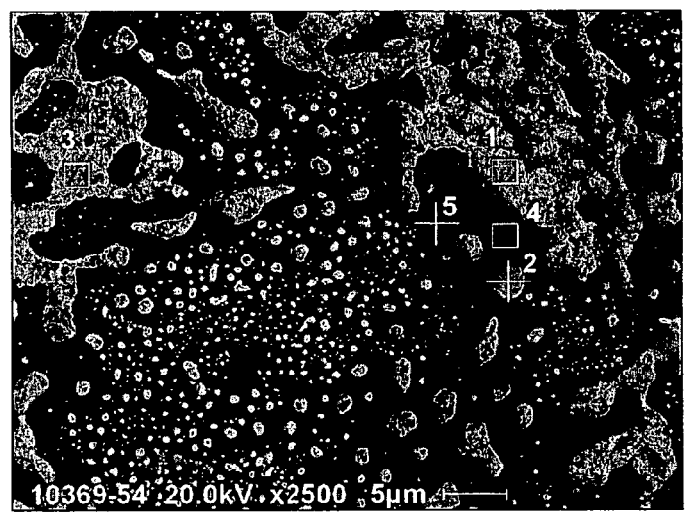
FIG. 7 is an SEM photomicrograph of a Pt:Sn=2.4:1 catalyst.

SEM micrographs of both samples showed very different morphology of the catalyst surface. The high Sn loading catalyst showed spherical Sn particles as large as 20 μm in diameter (FIG. 6). Platinum or alloy particles were scarcely found but a Pt particle in ~2 μm size was found and an EDS analysis showed that it was alloyed with Sn. The low Sn loading catalyst showed enhanced alloy formation between Pt and Sn and a large range of particle sizes as shown in FIG. 7 including some very large (greater than 5 μm irregularly shaped flat islands). The surface of the low Sn catalyst was scraped off with a razor blade and the particles analyzed. It contained smaller particles of Pt and Pt—Sn alloy formation between 4-60 nm. A numerical analysis of the smaller particles showed an average size of 11 nm with a standard deviation of 10 nm.

We claim:

1. A process for converting ethane to ethylene, comprising:
   contacting ethane and oxygen in a reaction microchannel and removing heat from the reaction microchannel into an adjacent heat exchanger;
   wherein the reaction microchannel comprises a catalyst on a substrate;
   wherein the reaction microchannel comprises a metallic microchannel wall;
   wherein the substrate is coated with an aluminide layer;
   wherein the aluminide layer is coated with an alumina layer; and
   wherein a catalytic material is disposed on the alumina layer;
   wherein (a) at least 70% of the ethane entering the reaction microchannel is converted to products and the selectivity to ethene is at least 85%; or (b) at least 80% of the ethane entering the reaction microchannel is converted to products and the selectivity to ethene is at least 80%; and
   wherein the levels of selectivity and conversion are based on a single pass through the reaction microchannel.

2. The process of claim 1 wherein the substrate comprises the metallic microchannel wall.

3. The process of claim 1 wherein at least about 85% of the ethane entering the reaction microchannel is converted to products.

4. The process of claim 1 wherein the adjacent heat exchanger comprises a microchannel heat exchanger.

5. The process of claim 1 wherein the selectivity to ethene is in the range of 84% to about 93%.

6. The process of claim 1 wherein the dense and substantially defect-free alumina layer comprises a thermally-grown alumina layer.

7. The process of claim 1 wherein the catalyst is disposed in a first portion of the reaction microchannel that is adjacent to a second portion of the reaction microchannel without catalyst and wherein residence time of ethane in the first portion is less than half of the residence time of ethane in the second portion.

8. The process of claim 1 wherein the substrate comprises a wall of the reaction microchannel, and wherein less than 50% of the area of the reaction microchannel is coated with catalyst.

9. The process of claim 1 wherein $H_2$ is fed into the reaction channel in a ratio of ethane:$H_2$ in the range of 1:0.2 to 1:0.6, and wherein ethane and oxygen are fed into the reaction channel in a ratio of ethane:$O_2$ in the range of 1.8 to 4.0.

10. The process of claim 9 wherein oxygen conversion is greater than 99%.

11. The process of claim 1 wherein $H_2$ is fed into the reaction channel in a ratio of ethane:$H_2$ in the range of 1:0.25 to 1:0.5, and wherein ethane and oxygen are fed into the reaction channel in a ratio of ethane:$O_2$ in the range of 1.8 to 4.0.

12. The process of claim 1 wherein oxygen is in a channel that is adjacent to the reaction microchannel and wherein the oxygen enters the reaction microchannel at more than 3 points along the length of the reaction microchannel.

13. The process of claim 12 wherein the reaction microchannel comprises a u-turn.

14. The process of claim 13 wherein a portion of the reaction microchannel with catalyst transfers heat to a portion of the reaction microchannel without catalyst.

15. The process of claim 1 wherein the reaction microchannel comprises a u-turn.

16. The process of claim 15 wherein a portion of the reaction microchannel with catalyst transfers heat to a portion of the reaction microchannel without catalyst.

17. A process for oxidative dehydrogenation, comprising:
passing an alkane over a fixed catalyst comprising Pt and Sn in a Pt/Sn atomic ratio in the range of 1 to 4 directly disposed on a thermally-grown oxide layer on an aluminide layer.

18. The process of claim 17 wherein the catalyst comprises Pt and Sn in a Pt/Sn atomic ratio in the range of about 2.3 to about 2.5.

19. The process of claim 18 wherein the thermally-grown oxide layer is disposed on the wall of a microchannel.

20. The process of claim 17 wherein the fixed catalyst consists essentially of Pt and Sn and the thermally grown oxide layer comprises dense and substantially defect-free alumina layer.

21. The process of claim 17 wherein the thermally-grown oxide layer is disposed on the wall of a microchannel.

22. The process of claim 21 wherein $H_2$ is recovered from product gas and at least a part of the recovered $H_2$ is fed back into the microchannel.

23. The process of claim 21 wherein the conversion of hydrocarbon (in a single pass) is 70% or higher.

24. The process of claim 17 wherein the fixed catalyst consists essentially of particles in the size range of between 4 and 60 nm.

25. A process for converting ethane to ethylene, comprising:
contacting ethane and oxygen in a reaction microchannel;
wherein the reaction microchannel comprises a catalyst coated on a wall of the reaction microchannel;
wherein (a) at least 50% of the ethane entering the reaction microchannel is converted to products and the selectivity to ethene is at least 85%; or
(b) at least 70% of the ethane entering the reaction microchannel is converted to products and the selectivity to ethene is at least 80%;
wherein the levels of selectivity and conversion are based on a single pass through the reaction microchannel;
wherein the reaction microchannel comprises a metallic microchannel wall;
wherein the metallic microchannel wall is coated with an aluminide layer;
wherein the aluminide layer is coated with a dense and substantially defect-free alumina surface layer; and
wherein a catalytic material is directly disposed on the surface layer.

26. The process of claim 25 wherein oxygen is in a channel that is adjacent to the reaction microchannel and wherein the oxygen enters the reaction microchannel at more than 3 points along the length of the reaction microchannel.

27. The process of claim 25 wherein the reaction microchannel comprises a u-turn.

28. The process of claim 27 wherein a portion of the reaction microchannel with catalyst transfers heat to a portion of the reaction microchannel without catalyst.

29. A process for converting ethane to ethylene, comprising:
contacting ethane and oxygen in a reaction microchannel;
wherein the reaction microchannel comprises a metallic microchannel wall;
wherein the metallic microchannel wall is coated with an aluminide layer;
wherein the aluminide layer is coated with a dense and substantially defect-free alumina surface layer; and
wherein a catalytic material comprising Pt and Sn in a Pt/Sn atomic ratio in the range of 1 to 4 is directly disposed on the surface layer; and
wherein (a) at least 50% of the ethane entering the reaction microchannel is converted to products and the selectivity to ethene is at least 85%; or (b) at least 70% of the ethane entering the reaction microchannel is converted to products and the selectivity to ethene is at least 80%; and
wherein the levels of selectivity and conversion are based on a single pass through the reaction microchannel.

* * * * *